(12) United States Patent
Guo

(10) Patent No.: US 11,014,507 B2
(45) Date of Patent: May 25, 2021

(54) VEHICLE MOUNTED DISPLAY DEVICE, CONNECTOR FOR VEHICLE-MOUNTED DISPLAY DEVICE AND VEHICLE WITH VEHICLE-MOUNTED DISPLAY DEVICE

(71) Applicant: BOE TECHNOLOGY GROUP CO., LTD., Beijing (CN)

(72) Inventor: Guogang Guo, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 32 days.

(21) Appl. No.: 16/136,556

(22) Filed: Sep. 20, 2018

(65) Prior Publication Data
US 2019/0299875 A1    Oct. 3, 2019

(30) Foreign Application Priority Data
Mar. 30, 2018  (CN) .......................... 201820444332.2

(51) Int. Cl.
| | | |
|---|---|---|
| *B60R 11/02* | (2006.01) | |
| *F16F 15/04* | (2006.01) | |
| *F16F 15/02* | (2006.01) | |
| *F16M 13/02* | (2006.01) | |
| *B60R 11/00* | (2006.01) | |

(52) U.S. Cl.
CPC ........ *B60R 11/0235* (2013.01); *F16F 15/022* (2013.01); *F16F 15/046* (2013.01); *F16M 13/02* (2013.01); *B60R 2011/0066* (2013.01)

(58) Field of Classification Search
CPC . F16M 13/02; B60R 11/0229; B60R 11/0235; B60R 2011/0066; F16F 15/022; F16F 15/046
See application file for complete search history.

(56) References Cited

U.S. PATENT DOCUMENTS

| | | | | |
|---|---|---|---|---|
| 4,470,178 A | * | 9/1984 | Matsui ..................... | F16B 5/065 174/138 D |
| 4,495,380 A | * | 1/1985 | Ryan ..................... | F16B 21/082 174/138 D |
| 4,681,288 A | * | 7/1987 | Nakamura .............. | F16B 5/065 24/453 |
| 4,938,703 A | * | 7/1990 | Nakano .................. | H05K 7/142 174/138 D |
| 5,460,543 A | * | 10/1995 | Kosmala .................. | H05K 7/12 439/567 |
| 9,728,345 B1 | * | 8/2017 | Yoo ........................ | H05K 1/184 |
| 2001/0016432 A1 | * | 8/2001 | Yamauchi ............... | B60R 11/02 439/34 |

(Continued)

*Primary Examiner* — Rockshana D Chowdhury
*Assistant Examiner* — Douglas R Burtner
(74) *Attorney, Agent, or Firm* — Brooks Kushman P.C.

(57) ABSTRACT

The present disclosure provides a connector. The connector is applied in a vehicle-mounted display device and connected between a first component and a second component of the vehicle-mounted display device. The connector includes: a main body with a first end and an opposite second end; a limiting connection portion disposed at the first end of the main body and used to mount the main body to the second component; a deformable supporting portion that is deformable under force and disposed on the main body between the first end and the second end; and a fastening portion disposed at the second end of the main body and used to fix the first component.

6 Claims, 2 Drawing Sheets

(56) References Cited

U.S. PATENT DOCUMENTS

| | | | | |
|---|---|---|---|---|
| 2007/0210602 A1* | 9/2007 | Higgins | ............... | F16B 21/086 |
| | | | | 296/39.1 |
| 2008/0025813 A1* | 1/2008 | Wu | ..................... | H05K 7/1407 |
| | | | | 411/353 |
| 2008/0278918 A1* | 11/2008 | Tominaga | ............ | H05K 7/2049 |
| | | | | 361/719 |
| 2011/0043345 A1* | 2/2011 | Strahm | .................. | H05K 3/325 |
| | | | | 340/438 |
| 2012/0327628 A1* | 12/2012 | Shih | .................... | H05K 5/0204 |
| | | | | 361/807 |
| 2013/0163215 A1* | 6/2013 | Sun | ........................ | G06F 1/185 |
| | | | | 361/759 |
| 2015/0314498 A1* | 11/2015 | Iwasaki | .................. | F16H 25/24 |
| | | | | 411/427 |
| 2016/0234958 A1* | 8/2016 | Baumeister | ............. | F16B 5/125 |
| 2016/0295710 A1* | 10/2016 | Ueyama | ................... | H05K 5/02 |
| 2017/0264180 A1* | 9/2017 | Esposito | ............... | H02K 37/24 |
| 2018/0299750 A1* | 10/2018 | Vuillet | ................... | F16B 21/02 |
| 2019/0048916 A1* | 2/2019 | Wang | ..................... | F16B 21/20 |
| 2019/0069438 A1* | 2/2019 | Guo | ..................... | H05K 1/0203 |
| 2019/0155130 A1* | 5/2019 | Liao | .................... | F16M 11/105 |

* cited by examiner

VEHICLE MOUNTED DISPLAY DEVICE, CONNECTOR FOR VEHICLE-MOUNTED DISPLAY DEVICE AND VEHICLE WITH VEHICLE-MOUNTED DISPLAY DEVICE

CROSS-REFERENCE TO RELATED APPLICATION

This application claims priority to Chinese Patent Application No. 201820444332.2, filed on Mar. 30, 2018, which is incorporated herein by reference in its entirety.

TECHNICAL FIELD

The present disclosure relates to the field of vibration reduction technology, and in particular to a connector, a vehicle-mounted display device and a vehicle.

BACKGROUND

One vehicle-mounted display device is used in a special environment and moves along with one vehicle, unlike one monitor used on a desk is stationary. The vehicle runs in a complex environment, with both smooth asphalt and broken and poorly maintained low-grade roads. The defect rate of vehicle-mounted display devices is greater than that of desktop monitors. The main defects include that one liquid crystal display screen shows blurred screen or does not display. One main reason is that components (such as capacitors, resistors, coils, chips, etc.) of inner circuit boards of the vehicle-mounted display device are de-soldered, loosened and damaged due to long-term vibration impact.

SUMMARY

According to one aspect, one embodiment of the present disclosure provides a connector, applied in a vehicle-mounted display device and connected between a first component and a second component of the vehicle-mounted display device. The connector includes: a main body with a first end and an opposite second end; a limiting connection portion disposed at the first end of the main body and configured to mount the main body to the second component; a deformable supporting portion that is deformable under force and disposed on the main body between the first end and the second end; and a fastening portion disposed at the second end of the main body and configured to fix the first component.

Optionally, the deformable supporting portion includes at least two deformable supporting arms disposed at an outer circumferential surface of the main body around a circumferential direction of the main body; each deformable supporting arm extends in a length direction of the main body between the first end and the second end, and is depressed in a direction away from the outer circumferential surface of the main body to have a curved shape; two ends of each deformable supporting arm are oriented to the first end and the second end of the main body, respectively; and end surfaces of ends of the at least two deformable supporting arms, adjacent the second end of the main body, together defines a supporting surface for supporting the first component.

Optionally, one end of each deformable supporting arm is adjacent the first end of the main body and is fixed to the outer circumferential surface of the main body; and one end of each deformable supporting arm is adjacent the second end of the main body and is a free end.

Optionally, there is a gap between the free end of each deformable supporting arm and the main body.

Optionally, each deformable supporting arm and the main body are integrally formed from one piece of material.

Optionally, the supporting surface is a flat surface.

Optionally, the limiting connection portion includes a first stud structure that is in engagement with the second component; and the first stud structure and the main body are integrally formed from one piece of material.

Optionally, the fastening portion includes a second stud structure; the second stud structure and the main body are integrally formed from one piece of material; the second stud structure is configured to extend through the first component and engage with a nut to fix the first component.

Optionally, an axial length of the second stud structure is greater than a sum of a first distance and a thickness of the nut, where the first distance is a distance between an end surface of an end of the deformable supporting portion adjacent the second end of the main body and a bottom of the second stud structure in an axial direction of the second stud structure, and the bottom of the second stud structure is one end of the second stud structure, which is connected with the second end of the main body.

Optionally, the first distance is less than a thickness of the first component.

Optionally, a mounting groove is defined in at least one of end surfaces of the first end and second end of the main body.

Optionally, the main body is made of injection molding material by means of injection molding.

According to another aspect, one embodiment of the present disclosure provides a vehicle-mounted display device. The vehicle-mounted display device includes a housing; a circuit board within the housing; and a connector connected between the circuit board and the housing. The connector includes: a main body with a first end and an opposite second end; a limiting connection portion disposed at the first end of the main body and connected with the housing; a fastening portion disposed at the second end of the main body and connected with the circuit board; and a deformable supporting portion that is deformable under force and disposed on the main body between the first end and the circuit board.

Optionally, the deformable supporting portion includes at least two deformable supporting arms disposed at an outer circumferential surface of the main body around a circumferential direction of the main body; each deformable supporting arm extends in a length direction of the main body between the first end and the second end, and is depressed in a direction away from the outer circumferential surface of the main body to have a curved shape; two ends of each deformable supporting arm are oriented to the first end and the second end of the main body, respectively; end surfaces of ends of the at least two deformable supporting arms, adjacent the second end of the main body, together defines a supporting surface; and the supporting surface supports the first component.

Optionally, one end of each deformable supporting arm is adjacent the first end of the main body and is fixed to the outer circumferential surface of the main body; and one end of each deformable supporting arm is adjacent the second end of the main body and is a free end; there is a gap between the free end of each deformable supporting arm and the main body; and the free end of each deformable supporting arm supports the circuit board.

Optionally, the limiting connection portion includes a first stud structure; the housing is provided with a positioning column; the first stud structure is in engagement with the positioning column; and the fastening portion includes a second stud structure; and the second stud structure extends through the circuit board and engages with a nut.

Optionally, wherein each deformable supporting arm and the main body are integrally formed from one piece of material.

According to another aspect, one embodiment of the present disclosure provides a vehicle including the above vehicle-mounted display device.

BRIEF DESCRIPTION OF THE DRAWINGS

A brief introduction will be given hereinafter to the accompanying drawings which will be used in the description of the embodiments in order to explain the embodiments of the present disclosure more clearly. Apparently, the drawings in the description below are merely for illustrating some embodiments of the present disclosure. Those skilled in the art may obtain other drawings according to these drawings without paying any creative labor.

DETAILED DESCRIPTION

Figure 1:
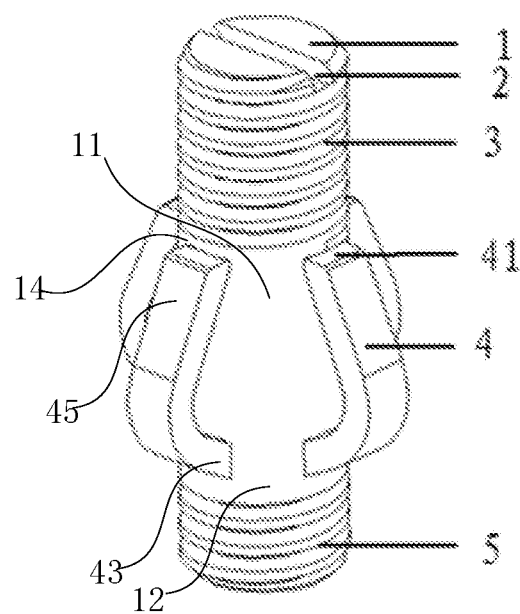
FIG. 1 is a schematic view of a connector according to an embodiment of the present disclosure.
Figure 2:
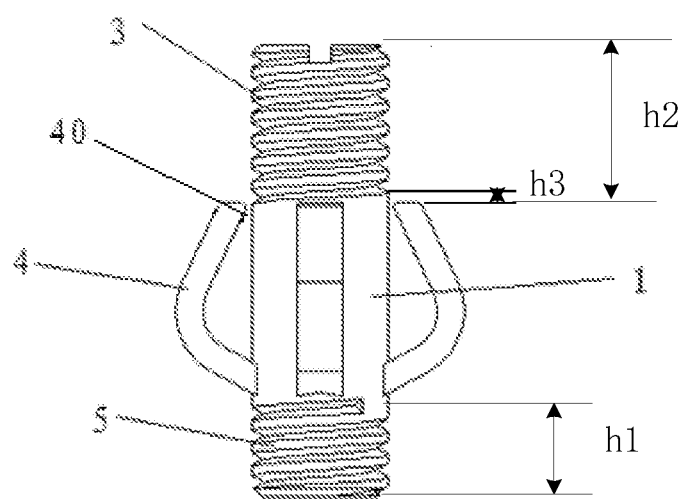
FIG. 2 is a side view of the connector shown in FIG. 1.
Figure 3:
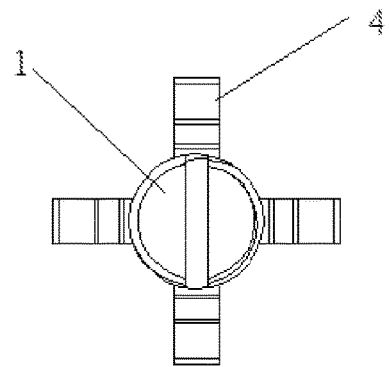
FIG. 3 is a top view of the connector shown in FIG. 1.

Reference will now be made in detail to exemplary embodiments, examples of which are illustrated in the accompanying drawings. The following description refers to the accompanying drawings in which the same numbers in different drawings represent the same or similar elements unless otherwise indicated. The following description of exemplary embodiments is merely used to illustrate the present disclosure and is not to be construed as limiting the present disclosure.

At present, in one vehicle-mounted display device, a circuit board is usually locked to a positioning column of a housing by means of a combined screw (which includes a crew and a spring washer). Then, the circuit board and the housing are rigidly connected together to form a whole. The impact of vehicle vibration is transmitted to the housing of the display device, and then the circuit board is directly subjected to the impact of vehicle vibration since the housing is rigidly connected to the circuit board.

In order to solve the above problem, one embodiment of the present disclosure provides a connector, a vehicle-mounted display device and a vehicle.

It should be noted, in one embodiment of the present disclosure, a connector is used to connect a first component to a second component and is between the first component and the second component. In order to illustrate specific structures of the connector, the structures and principle of the connector are illustrated hereinafter by taking an example in which the first component is a vehicle-mounted display device and the second component is a housing of a vehicle, of course, the specific structures of the first component and the second component are not limited thereto.

As shown in FIG. 1 to FIG. 4, one embodiment of the present disclosure provides a connector which is used to connect a first component 10 to a second component 20 and is between the first component 10 and the second component 20. The connector includes a main body 1, a limiting connection portion (i.e., a first stud structure 5), a deformable supporting portion (i.e., a deformable supporting arm 4) that deforms under force, and a fastening portion (i.e., a second stud structure 3).

The main body 1 includes a first end 12 and a second end 14. The first end 12 and the second end 14 are two opposite ends of the main body 1.

The limiting connection portion is disposed at the first end 12 of the main body 1. The limiting connection portion is used to limit and mount the main body 1 to the second component 20.

The deformable supporting portion that deforms under force is disposed at the main body 1 between the first end 12 and the second end 14.

The fastening portion is disposed at the second end 14 of the main body 1. The fastening portion is used to mount the first component 10.

By means of the main body 1, the limiting connection portion disposed at the first end 12 of the main body 1, the fastening portion disposed at the second end 14 of the main body 1, the connector connects the first component 10 to the second component 20 and is between the first component 10 and the second component 20. Meanwhile, the deformable supporting portion disposed at the main body 1 between the first end 12 and the second end 14 can deform under force, to absorb vibration impact applied to the first component 10 and thus play a buffer role, thereby enabling the first component 10 to be flexibly connected with the second component 20 and then preventing the first component 10 from being damaged by vibration.

The deformable supporting portion may be in a variety of forms, as long as it can deform under force to mitigate vibration impact applied to the second component 20. In the embodiment shown in FIG. 1, the deformable supporting portion includes at least two deformable supporting arms 4 disposed at an outer circumferential surface 11 of the main body 1 around a circumferential direction of the main body 1. Each deformable supporting arm 4 extends in a length direction of the main body 1 between the first end and the second end, and is depressed in a direction away from the outer circumferential surface 11 of the main body 1 to have a curved shape. Two ends of each deformable supporting arm 4 are oriented to or point to the first end and the second end of the main body 1, respectively. End surfaces 41 of ends of the at least two deformable supporting arms, adjacent the second end of the main body 1, together defines a supporting surface for supporting the first component 10.

The quantity of the deformable supporting arms 4 may be set according to actual needs. In one embodiment shown in FIG. 2 and FIG. 3, four deformable supporting arms 4 are evenly disposed at the outer circumferential surface 11 of the main body 1 and spaced from each other.

The deformable supporting arm 4 may be in a variety of forms. In one embodiment, the deformable supporting arm 4 is a teardrop-shaped semicircular arc, which is not limited thereto.

The deformable supporting arm 4 may be a curved structure that extends in the length direction of the main body 1 and is depressed in the direction away from the outer circumferential surface 11 of the main body 1, and buffer impact energy transmitted by vibration of a vehicle body. A cross-sectional area and angle (curvature) of the deformable supporting arm 4 are related to the weight of the circuit board to be supported and impact energy. In one embodiment, the deformable supporting arm 4 may absorb 2G gravity acceleration shocks, which is not limited thereto.

In one embodiment, one end 43 of the deformable supporting arm 4 is adjacent the first end 12 of the main body 1, and is fixed to the outer circumferential surface 11 of the main body 1. One end 45 of the deformable supporting arm 4 is adjacent the second end 14 of the main body 1 and is a free end.

In one embodiment, there is a gap 40 between the free end of the deformable supporting arm 4 and the main body 1.

Compared with a connection mode in which the free end is in contact with the main body 1, a connection mode in which the free end is spaced from the main body 1 with the gap, can reduce friction between the deformable supporting arm 4 and the main body 1 when the deformable supporting arm 4 is deformed under force, thereby facilitating deformation of the deformable supporting arm 4 and damping.

In one embodiment, the gap 40 is 0.2 mm, which is not limited thereto.

In one embodiment, in order to ensure stability of connection between the deformable supporting arm 4 and the main body 1, the deformable supporting arm 4 and the main body 1 may be integrally formed from one piece of material. This can prevent the deformable supporting arm 4 from being separated from the main body 1 when the deformable supporting arm 4 is deformed under force.

In one embodiment, in order to facilitate supporting the first component 10 (i.e., the first component 10 is a circuit board with a connection surface for connecting the deformable supporting arm 4, and the connection surface is a flat surface), the supporting surface is a flat surface.

In one embodiment, the second component 20 is provided with a positioning column 201. The limiting connection portion includes a first stud structure 5 that is in engagement with the positioning column 201. The first stud structure 5 and the main body 1 may be integrally formed from one piece of material.

Figure 4:
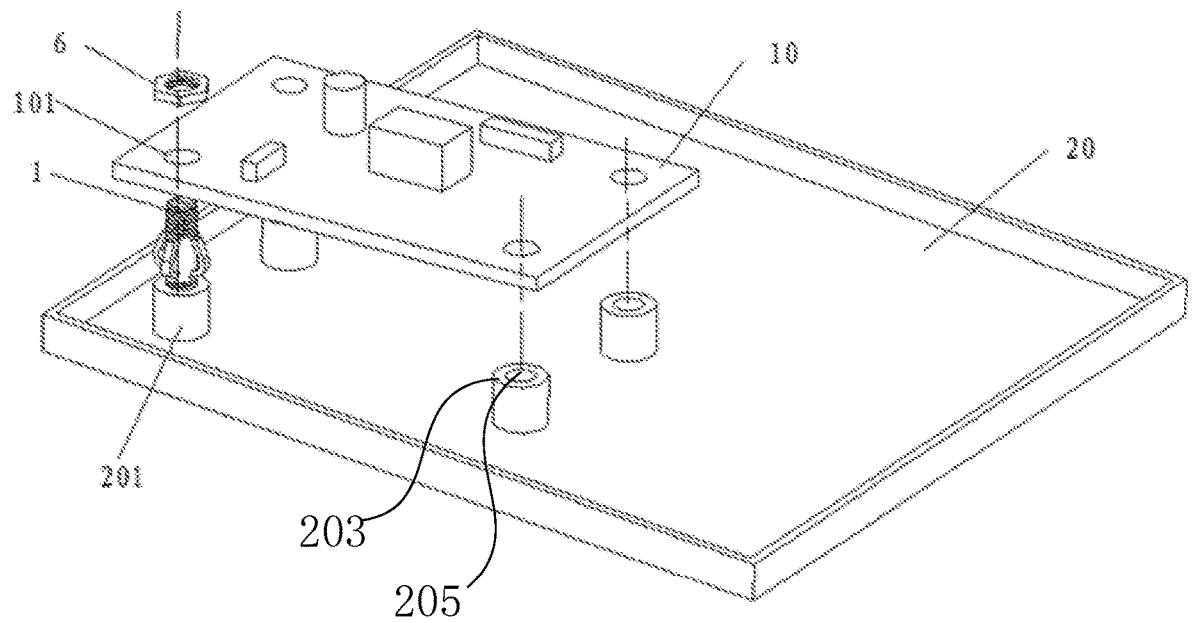
FIG. 4 is a schematic view showing an assembly state of a circuit board and a housing according to an embodiment of the present disclosure.

As shown in FIG. 4, the positioning column 201 has a connection surface 203 facing the first component 10, and a through hole 205 is defined in the connection surface 203. An internal thread is formed in an inner wall of the positioning column 201 to define an accommodation space for holding the first stud structure, and the inner wall of the positioning column 201 enclose the through hole 205. The internal thread engages with the external thread of the first stud structure.

The main body 1 and the second component 20 are connected by means of screw bolts, thereby facilitating disassembly between the second component 20 and the main body 1.

In one embodiment, in order to ensure stability of connection between the first component 10 and the connector, an axial length h1 of the first stud structure 5 is greater than or equal to 3 mm.

The fastening portion may be in a variety of form. In one embodiment, the first component 10 is provided with a mounting hole 101, and then the fastening portion includes a second stud structure 3. The second stud structure 3 and the main body 1 are integrally formed. The second stud structure 3 extends through the mounting hole 101 and then engages with a nut 6, thereby fixing the first component 10.

In one embodiment, an axial length h2 of the second stud structure 3 is greater than a sum of a first distance h3 and a thickness of the nut 6. The first distance h3 is a distance between the end surface of the end 45 of the deformable supporting portion and a bottom of the second stud structure 3 in an axial direction of the second stud structure 3. The bottom of the second stud structure 3 is one end of the second stud structure 3, which connects with the second end of the main body 1.

Optionally, a difference between the axial length h2 of the second stud structure 3 and the sum of the first distance h3 and the thickness of the nut 6, is 2 mm, which is not limited thereto.

In one embodiment, the first distance h3 is less than a thickness of the first component 10, so that after the first component 10 is fixed by means of the fastening portion and the nut, the engagement between the fastening portion and the nut applies a biasing force in a direction from the second end to the first end of the main body 12 to the first component 10.

Optionally, a difference between the first distance h3 and the thickness of the first component 10 is 0.5 mm, which is not limited thereto.

In one embodiment, a mounting groove 2 is defined in at least one of the end surfaces of the first end and second end of the main body 1. A screwdriver may be inserted in the mounting groove 2 and rotates the main body 1, thereby mounting the main body 1 to the second component 20. Specific shape of the mounting groove 2 may be in a variety of forms, such as linear shape or criss-cross shape.

In one embodiment, the main body 1 is made of injection molding material by means of injection molding, thereby enabling the main body 1 to have performance including impact resistant and vibration resistant.

Optionally, the main body 1 is made of nylon material by means of injection molding (which is not limited thereto), and may be produced in large quantities with controllable cost and wide application scope.

One embodiment of the present disclosure further provides a display device. The display device includes a housing such as the second component 20, a circuit board such as the first component 10 disposed within the housing, and the above connector. The connector connects the circuit board to the housing and is between the circuit board and the housing.

The presence of the connector enables the circuit board to be flexibly connected with the housing, thereby effectively preventing the circuit board from being damaged by vibration.

In one embodiment, the display device is a vehicle-mounted display device.

One embodiment of the present disclosure further provides a vehicle including the above display device.

The above are merely the optional embodiments of the present disclosure and shall not be used to limit the scope of the present disclosure. It should be noted that, a person skilled in the art may make improvements and modifications without departing from the principle of the present disclosure, and these improvements and modifications shall also fall within the scope of the present disclosure.

What is claimed is:

1. A vehicle-mounted display device comprising:
a housing;
a circuit board within the housing; and
a connector connected between the circuit board and the housing;
wherein the connector includes:
a main body with a first end and an opposite second end;
a limiting connection portion disposed at the first end of the main body and connected with the housing;
a fastening portion disposed at the second end of the main body and connected with the circuit board; and a deformable supporting portion that is deformable under force and disposed on the main body between the first end and the circuit board;
wherein the deformable supporting portion comprises at least two deformable supporting arms disposed at an outer circumferential surface of the main body around a circumferential direction of the main body;
wherein a mounting groove is defined in an end surface of at least one of the first end and the second end of the main body; a screwdriver is insertable in the mounting groove to rotate the main body to mount the main body to the housing; the mounting groove is a linear shape or a criss-cross shape;
wherein each deformable supporting arm extends in a length direction of the main body between the first end and the second end, and is depressed in a direction away from the outer circumferential surface of the main body to have a curved shape; two ends of each deformable supporting arm are oriented to the first end and the second end of the main body, respectively; end surfaces of ends of the at least two deformable supporting arms, adjacent the second end of the main body, together defines a supporting surface; and the supporting surface supports the circuit board:
wherein one end of each deformable supporting arm is adjacent the first end of the main body and is fixed to the outer circumferential surface of the main body; and one end of each deformable supporting arm is adjacent the second end of the main body and is a free end; there is a gap between the free end of each deformable supporting arm and the main body; and the free end of each deformable supporting arm supports the circuit board.

2. The vehicle-mounted display device of claim 1, wherein the limiting connection portion includes a first stud structure; the housing is provided with a positioning column; the first stud structure is in engagement with the positioning column; and
the fastening portion includes a second stud structure; and the second stud structure extends through the circuit board and engages with a nut.

3. The vehicle-mounted display device of claim 2, wherein each deformable supporting arm and the main body are integrally formed from one piece of material.

4. A vehicle comprising the vehicle-mounted display device of claim 1.

5. The vehicle-mounted display device of claim 1, wherein the deformable supporting arm is a teardrop-shaped semicircular arc.

6. The vehicle-mounted display device of claim 1, wherein the main body is made of injection molding material by means of injection molding.

* * * * *